Sept. 2, 1958        R. E. HAYNES        2,849,940
HILLER BLADES FOR FARM CULTIVATORS
Filed Jan. 27, 1955
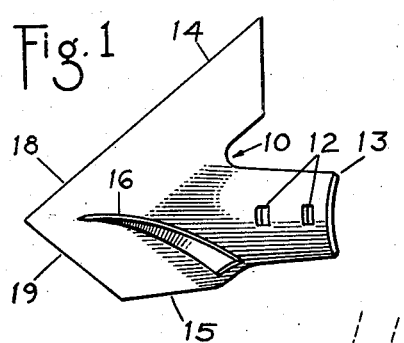
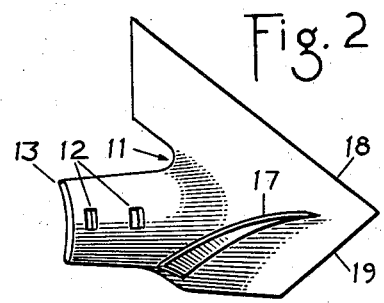
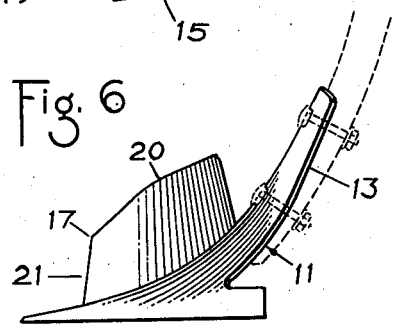
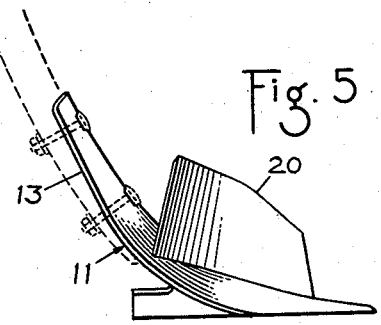
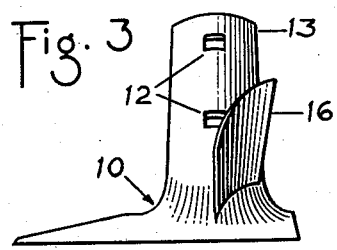
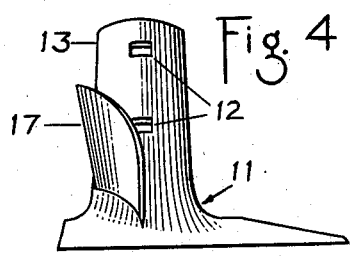
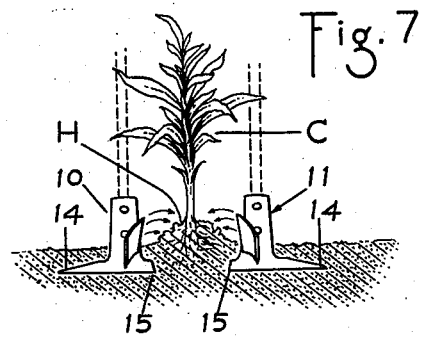
RAYMOND E. HAYNES
INVENTOR.
BY *G. Lorenzo Miller*
ATTORNEY

United States Patent Office 2,849,940
Patented Sept. 2, 1958

2,849,940

HILLER BLADES FOR FARM CULTIVATORS

Raymond E. Haynes, Bement, Ill.

Application January 27, 1955, Serial No. 484,355

2 Claims. (Cl. 97—204)

This invention relates to hiller blades for farm cultivators.

A primary object of the invention is to provide novel right and left blades for use on a plant row cultivator and wherein said blades are characterized by relatively short inwardly extending portions and relatively long outwardly extending portions, and wherein the latter portions function to loosen the soil while the shorter portions provide ample clearance between the pair of opposing blades as to avoid damage to the roots of the plants.

A further object of the invention is to provide each of said blades with an upwardly extending fore and aft convex wing member adjacent the shorter portion thereof for throwing a substantial volume of the soil loosened by the blades around the roots of the plants.

Other objects and advantages of the invention will become apparent in the course of the following detailed description, taken in connection with the accompanying drawing, wherein—

Fig. 1 is a top plan view of the right hand cultivator blade of an opposing pair thereof which are adapted to be secured to the shanks of a cultivator frame.

Fig. 2 is a top plan view of the left hand blade of the said pair thereof.

Fig. 3 is a front elevational view of the right hand blade.

Fig. 4 is a front elevational view of the left hand blade.

Fig. 5 is a side elevational view as observed from the inner side of the blade shown in Fig. 4.

Fig. 6 is a side elevational view as observed from the outer side of the blade shown in Fig. 4.

Fig. 7 is a view showing the pair of opposing blades on a reduced scale in front elevation corresponding to Figs. 3 and 4 and with the blades operatively secured to the cultivator shanks indicated in dotted lines, and the view further showing a plant intermediate the blades and with the soil being thrown about the roots of the plant, by the said blades.

Referring now in detail to the drawing, 10 designates a right hand blade and 11 designates a left hand blade as considered in the direction of cultivator movement.

The two blades 10 and 11 are of like form except that they are reversed in order to function equally with respect to a plant row intermediate same.

It is to be particularly observed that the blades are not symmetrical to a plane extending centrally through the square bolt receiving apertures 12 in the blade shanks 13 and an important feature of the invention is this non-symmetrical arrangement for reasons later to appear.

While it is highly important that the blades loosen the soil adjacent the rows of plants being cultivated, it is equally important that the blades do not disturb the plant roots.

Accordingly the blades 10, 11 extend to one side of said plane to substantially the extent of the usual form of blades, as is indicated at 14, while the blades are foreshortened at the opposite side of the said plane, as indicated at 15.

The purpose of the above described blade forms will be readily understood upon consideration of Fig. 7 wherein a right hand blade 10 is disposed at one side of a row of corn C being cultivated, while a left hand blade 11 is shown at the opposite side and with the two blades in symmetrical relation to the row of corn C.

With this disposition of the blades, the wider portions 14 are disposed most remote from the row of corn while the narrower portions 15 are disposed adjacent the row of corn. The wider portions 14 function to loosen and mellow the soil while the narrower portions 15 are disposed sufficiently remote from the corn plant roots so as not to cut off nor injure the lead roots or even the fibers of the plants from which it is obvious that the feeding of natural moisture from the earth up into the corn stalks is wholly uninterrupted.

A further important feature of the invention is the provision of a hilling wing member 16 on the right hand blade 10 and a similar wing member 17 is provided on the left hand blade 11.

As is indicated more particularly in Figs. 3, 4 and 7, the wing members 16 and 17 are disposed in generally vertical position on the respective blades 10 and 11 adjacent their narrower portions 15 and the opposing pair of wing members are inwardly concave, or concaved toward the row of corn C, as is clearly indicated in Fig. 7 whereby a major volume of the soil loosened by the narrower blade portions 15 is thrown inwardly in the form of a hill H about the stalks of corn.

It is to be particularly observed that the angularly disposed edges 18 and 19 of the blades 10 and 11 are sharp for facilitating the soil cutting action of the blades.

Furthermore, the advance free edges 20 and 21 of the wing members 16 and 17 are also sharp to facilitate movement of the wing members through the loosened soil.

It should be apparent from the above description that the improved hiller blades perform hilling operations with maximum efficiency while at the same time avoid damage to the plants being cultivated as well as the highly important root system thereof.

While I have disclosed my invention in accordance with a single specific structural embodiment thereof, such is to be considered as illustrative only, and not restrictive, the scope of the invention being defined in the subjoined claims.

What I claim and desire to secure by U. S. Letters Patent is:

1. A hiller blade for plant row cultivators, comprising an attaching shank, a relatively wide soil loosening portion upwardly inclined towards the rear at one side of said shank, a relatively narrow soil loosening portion upwardly inclined towards the rear on the opposite side of said shank, the forward ends of said loosening portions merging into the point for the hiller blade, the relatively wide soil loosening portion being of greater length than the other soil loosening portion, a wing member integral with and mounted on the top surface of said narrow portion for throwing soil loosened by said narrow portion outwardly therefrom, said wing member being upright and extending from adjacent the point of the hiller blade rearwardly and outwardly from said shank.

2. The structure according to claim 1 wherein the outer edges of the soil loosening portions of the hiller blade and said wing member have sharpened leading edges.

References Cited in the file of this patent

UNITED STATES PATENTS

| 109,491 | Brinly | Nov. 22, 1870 |
| 729,198 | Meister | May 26, 1903 |
| 983,629 | Lundell | Feb. 7, 1911 |
| 1,165,965 | Gausman | Dec. 28, 1915 |
| 2,087,118 | Rooks | July 13, 1937 |
| 2,343,616 | Kay | Mar. 7, 1944 |